J. H. BARRETT.
SPRING TIRE.
APPLICATION FILED FEB. 7, 1913.
1,130,367.
Patented Mar. 2, 1915.
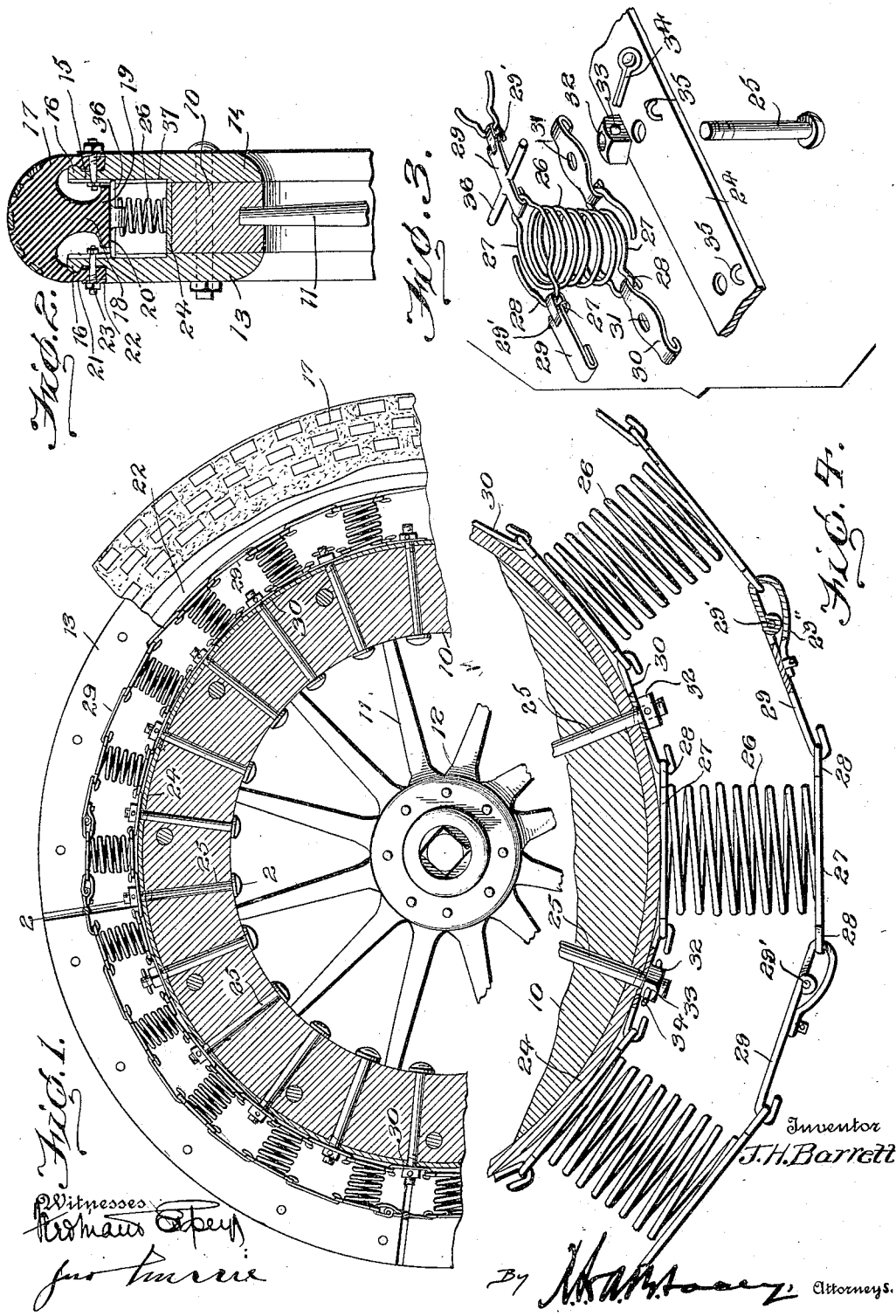

UNITED STATES PATENT OFFICE.

JOHN H. BARRETT, OF PASO ROBLES, CALIFORNIA.

SPRING-TIRE.

1,130,367.  Specification of Letters Patent.  Patented Mar. 2, 1915.

Application filed February 7, 1913. Serial No. 746,947.

*To all whom it may concern:*

Be it known that I, JOHN H. BARRETT, citizen of the United States, residing at Paso Robles, in the county of San Luis Obispo and State of California, have invented certain new and useful Improvements in Spring-Tires, of which the following is a specification.

This invention relates to resilient wheels. The primary object of the invention is to provide a spring wheel which will have the same resiliency as a pneumatic tired wheel, and which will not be subject to punctures and rim cuts.

A further object of the invention is to provide a resilient spacing member which may be attached to the rim in the manner of a chain, that is, the springs may be assembled in spaced relation and then attached to the rim of the wheel as an entirety.

A further object of the invention is to provide means for guiding the springs in their cushioning movement.

A still further object of the invention is to provide a construction which will permit the springs to be renewed without disturbing the adjacent springs.

Another object of the invention is to provide a construction in which a tire may be conveniently attached and removed in the same manner as a pneumatic tire, this construction permitting anti-skid tires to be substituted for smooth tires when desired.

In the drawings: Figure 1 is a side elevation of the wheel, a portion of the side plates and tire being broken away to illustrate the arrangement of the springs; Fig. 2 is a transverse section; Fig. 3 is a disassembled perspective showing a portion of the resilient chain and the manner in which it is supported on the rim; and Fig. 4 is a detail view of a portion of the cushioning member.

Broadly, the invention contemplates spaced inner and outer rims, there being a cushioning device disposed between the rims. It has been the usual practice to secure the spacing springs in wheels of this character individually to the inner rim, and this construction requires very accurate adjustment of the spring and necessitates the work being done by skilled mechanics. The present invention is designed to provide a construction which may be assembled by unskilled persons, thereby allowing the wheel to be shipped in a disassembled condition and accurately assembled, the work of assembling the parts being accomplished in a simple manner. The construction thus not only allows the device to be assembled by unskilled workmen, but permits the repairing and renewing of the various parts to be easily accomplished.

The device comprises a rim 10 which is supported by the spokes 11 which are secured to the hub 12 in the usual manner. A plurality of annular plates 13 and 14 are bolted to the rim 10, said plates projecting beyond the rim. The outer edges of these plates are reduced in thickness, as at 15, the reduced extensions being formed with a beading 16. The tire 17 is formed of rubber and reduced as at 18, the reduced portion being disposed between the plates 13 and 14. The tire is increased in thickness at 19 and formed with a flat bearing surface 20 which contacts with the springs, which will be hereinafter described. The overhanging sides 21 embrace the reduced extensions 15 of the plates 13 and 14 being provided with apertures in which suitable gromets may be arranged to prevent wear. An annular ring 22, which is formed with apertures disposed to register with the apertures formed in the tire, contacts with the outer faces of the overhanging portions, tapered bolts 23 passing through said ring and the apertures in the tire, said bolts extending through the reduced portions 15 of the plates 13 and 14 and holding the tire in position on the plates.

A metallic rim 24 is arranged on the rim 10, being secured thereto by bolts 25 which pass through the rim, the bolts being disposed throughout the entire circumference of the rim and in spaced relation. These bolts not only form securing means for the metallic rim 24, but form a retaining means for the resilient spacing member. This resilient member comprises coiled springs 26, the terminal convolutions 27 of which are formed with the outwardly bent portions 28 to which the connecting members for the springs are attached. The springs are disposed in spaced relation and are connected by links 29, the terminals of which are coiled about the outwardly bent portions 28, forming a hinged connection and permitting the springs to move with respect to each other, one of the terminals of the member 29 being formed with a portion 29' to which is hingedly connected the latch member 29'' the terminal of which is secured to the member 29. The lower terminals of the springs are connected by plates 30 which are formed centrally with an aperture 31 through which the bolt 25 passes. A nut 32 is threaded on said bolt, said nut being formed with a transverse opening 33 through which a cotter pin 34 may be inserted to prevent the displacement of the nut, the cotter pin being held against accidental displacement by a loop 35 carried by the metallic rim 24. By this construction, it will be noted that a resilient chain is provided which, when placed within the space between the plates 13 and 14, may be connected with all the springs in position, the bolts 25 assuring the proper spacing of the chain and holding it against rotation with respect to the rim.

While the springs may be assembled on the rim as an entirety, it will be noted that by removing certain bolts that any of the springs may be removed and replaced without affecting the remaining portion of the chain. Thus, as stated above, the device may be assembled and accurately positioned by reason of its construction without the necessity of exercising any particular amount of care in the matter of adjustment.

The chain is provided at different points throughout its length with means for properly directing the radial movement of the springs during their expansion and contraction. This means consists of the transverse trunnions or pins 36 which are formed integral with links 29 which connect the outer convolutions of certain of the springs, these springs being of a number consistent with the diameter of the rim. The plates 13 and 14 are formed with grooves 37 which receive the terminals of these trunnions, the trunnions riding in the grooves as the springs are moved with respect to the rim. By this construction, it will be seen that the chain may be supported against rotation with respect to the rim and properly directed in its radial cushioning movement.

The enlarged portion 19 of the tire rests upon the springs 26, and the links 29. The portions 18 of the tire are spaced sufficiently from the edge portions of the reduced extensions 15 of the plates 13 and 14 to allow the tire to be compressed, the reduced portion of the tire being projected between the plates 13 and 14 when the load is applied.

The many advantages of a construction of this character will be clearly apparent, as it will be noted that the structure is such as may be easily and economically manufactured and that the various parts may be readily assembled.

Having thus described my invention, what I claim as new and desire to secure by Letters Patent is:—

1. A vehicle wheel including a rim, circular plates secured to the opposite faces of the rim and extending beyond the periphery thereof to form an annular chamber, a tread member having an annular inwardly extending portion adapted to be freely received within said annular chamber, and cushioning means interposed between the tread member and the rim for yieldably supporting the tread thereon, said means including a plurality of circumferentially spaced helical springs arranged with their longitudinal axes extending radially with respect to the rim, the terminal convolutions of each of said spring members being bent outwardly at diametrically opposite points, link members having hooks engaging the outwardly bent portions of the springs for connecting each spring to the next adjacent springs and means carried by the links and engageable with the plates for guiding the springs, whereby they are expanded or contracted along radial lines with respect to the rim.

2. A vehicle wheel including a rim, spaced plates secured to the sides of the rim and extending beyond the periphery thereof, said plates having grooves formed in their inner faces, a tread member provided with an extension insertible between the plates, cushioning means interposed between the tread and the rim, said means including a plurality of helical springs, links connecting the terminals of each spring to the terminals of the adjacent springs, and guide arms extending laterally from certain of the links and engaging in the grooves of the plates whereby the springs are guided to move radially with respect to the rim when yielding to or recovering from a shock.

3. A vehicle wheel including a rim, a tread member, and a plurality of helical springs interposed between the tread member and the rim, the terminal convolutions of each of said springs being bent outwardly at diametrically opposite points, and links connecting the springs and engaging their outwardly bent portions.

4. A vehicle wheel including a rim, circular plates secured at the opposite faces of the rim and extending beyond the periphery thereof to form an annular chamber, the inner face of each of said plates being provided with a plurality of radially extending grooves, the grooves of the two plates being transversely alined in pairs, a tread member, and a plurality of helical springs arranged in the said annular chamber and interposed between the tread member and the rim for yieldably supporting the tread thereon, each of said springs having the terminal convolutions bent to form outwardly extending loops, and link members connecting the loops of each spring with the loops of the next adjacent springs, each of said links being provided with terminal hooks adapted to engage with the loop portion of the spring, and laterally extending arms carried by certain of said links, the outer terminals of each of said arms being mounted for sliding movement in one of said grooves whereby the springs are guided during expansion and contraction to move along radial lines with respect to the rim.

In testimony whereof I affix my signature in presence of two witnesses.

JOHN H. BARRETT. [L. S.]

Witnesses:
   J. M. FELTS,
   M. SHIMMIN.

Copies of this patent may be obtained for five cents each, by addressing the "Commissioner of Patents, Washington, D. C."